(12) United States Patent
Daly

(10) Patent No.: US 6,170,611 B1
(45) Date of Patent: Jan. 9, 2001

(54) METHOD AND APPARATUS FOR LOADING LUBRICANT INTO EARTH BORING BITS

(75) Inventor: Jeffery E. Daly, Cypress, TX (US)

(73) Assignee: Camco International Inc., Houston, TX (US)

(*) Notice: Under 35 U.S.C. 154(b), the term of this patent shall be extended for 0 days.

(21) Appl. No.: 09/326,236

(22) Filed: Jun. 4, 1999

Related U.S. Application Data

(60) Provisional application No. 60/087,912, filed on Jun. 4, 1998.

(51) Int. Cl.$^7$ .............................. F16N 29/02; E21B 10/24
(52) U.S. Cl. ...................... 184/6.14; 184/55.1; 175/228
(58) Field of Search ........................... 184/6.14, 54, 55.1; 175/228; 384/93

(56) References Cited

U.S. PATENT DOCUMENTS

| | | |
|---|---|---|
| 4,019,785 | 4/1977 | Stinson et al. . |
| 4,199,856 | 4/1980 | Farow et al. . |
| 4,441,244 * | 4/1984 | Cason, Jr. ............................. 29/434 |
| 5,383,525 | 1/1995 | Daly et al. . |

* cited by examiner

Primary Examiner—Richard M. Lorence
(74) Attorney, Agent, or Firm—Jeffery E. Daly

(57) ABSTRACT

A method and apparatus for loading lubricant into a bit chamber of an earth boring bit measures and controls the pressure of pressurized lubricant at the bit chamber while the lubricant is being loaded into the bit.

34 Claims, 4 Drawing Sheets

METHOD AND APPARATUS FOR LOADING LUBRICANT INTO EARTH BORING BITS

BACKGROUND OF THE INVENTION

Related Application

This application claims the benefit of U.S. Provisional Patent Application, Serial No. 60/087,912, filed Jun. 4, 1998, entitled Method and Apparatus for Loading Lubricant into Earth Boring Bits.

FIELD OF THE INVENTION

The invention relates to a method and apparatus for loading lubricant into rolling cutter earth boring bits used for oil and gas drilling and other forms of mineral mining.

DESCRIPTION OF THE RELATED ART

In the manufacture of lubricated, rolling cutter earth boring bits, or commonly referred to as rock bits, or drill bits, the process of filling the bit with lubricant is one of the most critical and, at the same time, most technologically ignored processes in the overall rock bit manufacturing process. The basic steps required to properly load lubricant into a rock bit are: (1) evacuate the air from within the bit; (2) introduce lubricant under pressure into the bit without introducing air; (3) disconnect the lubricant loading device from the drill bit; and (4) purge the lubricant from the passages in the loading device which are used during the evacuation step.

A typical rolling cutter earth boring bit has numerous dead-end passageways and cavities which must be completely filled with lubricant if the bit is to operate properly. Also, care must be taken during loading of the lubricant into the rock bit to prevent damage to its seals or bearing systems within the bit due to the generally high pressure of the lubricant as it is loaded. Because the typical rolling cutter rock bit lubricant is a viscous grease, it is difficult to apply enough pressure to the lubricant to completely fill the bit in a timely manner without harming the seals or bearings.

In operation, rock bits are often immersed in fluid with very high hydrostatic pressures, often exceeding 10,000 PSI. A pressure compensating device is usually provided in the lubrication system to transmit this hydrostatic pressure to the lubrication system. As the hydrostatic pressure increases, the lubricant is forced into any spaces within the bit which had been void of lubricant. The pressure compensating device for the lubrication system must have the capacity to sweep a volume of lubricant from a reservoir into these spaces to maintain pressure balance.

Due to the limited space available in rolling cutter earth boring bits, this reservoir contains a limited amount of the lubricant, or grease. It is important, therefore, that the lubricant loading process be carried out in a manner which minimizes spaces void of lubricant. Ideally, the lubricant is introduced at the highest possible pressure that the bit will tolerate without damage. This assures that the maximum volume of lubricant is loaded into the bit. However, due to the "saw tooth" pressure variations, or pressure spikes, inherent in the design of grease pumps used for lubricant loading, the pressure is rather hard to control, and such pressure spikes might cause pressure to exceed the pressure limits of the seals and/or bearing systems of the rock bit. Consequentially, the pumps are often set at an average pressure much lower than optimal for maximum lubricant fill.

There is an added difficulty caused by the very high viscosity of most rock bit lubricants, or greases. In order to make the lubricant flow at a reasonable rate from the pump to the bit, it is very desirable to have a relatively high pressure setting at the pump. The higher the differential pressure of the lubricant, the faster the lubricant will flow. At the start of the loading process, high differential pressures can be applied to the lubricant and it can flow into the bit at a fairly high rate without building excessive pressure within the bit. As loading progresses, the pressure of the lubricant slowly builds within the bit. Finally, when loading is nearly complete, the pressure of the lubricant within the bit approaches the pressure setting of the pump. To prevent over pressurization of the bit, the pressure of the pump is limited to the maximum pressure allowed at the bit. Since the pump pressure setting is not readily changed during the loading process, the time required to load the lubricant is thus unnecessarily extended.

In recent years, many new rock bit designs have been introduced which have added special requirements on the lubricant loading system due to the use of specials seals, pressure compensation devices, or other components which may be damaged by excessive pressure forces during loading of the bit. Bits with volume compensating metal face seals must have the lubricant loaded carefully, or risk damage to the seal assembly. There are other bit designs that have lubricant vent systems designed to vent at low differential pressures. Finally, very large bits are now manufactured that have 300 square inches or more of "piston" area exposed to the pressure of the lubricant as it is loaded. Even if a modest lubricant loading pressure of 400 PSI is utilized, a staggering 120,000 pounds of force may be applied to the rock bit cutter retention system during the greasing operation. Hidden damage can result within the rock bit due to these excessive forces.

There is a need for a lubricant loading system for rock bits that can much more precisely control the pressure of the lubricant as it is being loaded and assure that the bit is fully loaded with lubricant. This lubricant loading system should have the ability to change the delivery pressure of the lubricant as the loading process proceeds in order to minimize the time required for loading.

SUMMARY OF THE INVENTION

The invention comprises a new type of lubricant loading machine for rock bits, and the bits lubricated by this machine. The new lubricant loading machine utilizes a closed loop pressure controlled lubricant loading system. In its most general form, the machine comprises a vacuum pump, a grease pump with proportional pressure control, a control system, and a pressure sensor. In operation the control device operates the vacuum pump to achieve less than 0.75 PSIA pressure in the cavities of the bit. While maintaining this level of vacuum, the control system operates appropriate valving to introduce lubricant to the bit.

The control system has a set point adjusted to a target lubricant pressure. The control system monitors the pressure signal from the lubricant pressure sensor, compares it to the set point value and sends a appropriate control signal to the proportional pressure controlled grease pump.

In accordance with the invention, the foregoing advantages have been achieved through the method and apparatus for loading lubricant into earth boring bits of the present invention. The apparatus of the present invention for loading lubricant into a bit chamber of an earth boring bit may include a means for removing air from the bit chamber; a means for providing pressurized lubricant to the bit chamber; a means for measuring the pressure of the lubricant at the bit chamber; and a control system for controlling and operating the pressurized lubricant providing means based upon the pressure of the lubricant. A further feature of the present invention is that the means for removing air may be a vacuum pump in fluid communication with the bit chamber. A low pressure transducer may be disposed between the bit chamber and the vacuum pump. An additional feature of the present invention may include a filter disposed between the bit chamber and the vacuum pump. Another feature of the present invention is that the means for providing pressurized lubricant may be a lubricant pump, and the lubricant pump may be a proportional air pressure operated lubricated pump. The lubricant pump may be powered by pressurized air provided by a proportional air regulator.

An additional feature of this aspect of the present invention is that a fluid passageway may be disposed between the means for providing pressurized lubricant and the bit chamber, including a means for purging lubricant from at least a portion of the fluid passageway. The means for measuring the pressure of the lubricant may be a high pressure transducer disposed adjacent to, and in fluid communication with, the bit chamber. An additional feature of the present invention is that the control system may be a closed loop control system, and the closed loop control system may operate to control the pressurized lubricant providing means to decrease the pressure of the pressurized lubricant, upon the lubricant pressure measuring means indicating that the pressure of the lubricant at the bit chamber has reached a predetermined value. A further feature of the present invention is that the closed loop control system may determine the volume of pressurized lubricant loaded into the bit chamber, and the closed loop control system may compare the volume to a standard volume of lubricant desired to be loaded into the bit chamber.

In accordance with another aspect of the present invention, the foregoing advantages have also been achieved through the method of the present invention for loading lubricant into a bit chamber of an earth boring bit. This aspect of the present invention may include the steps of: removing air disposed within the bit chamber; providing pressurized lubricant to the bit chamber; measuring the pressure of the lubricant at the bit chamber; and controlling the providing of pressurized lubricant to the bit chamber. Another feature of this aspect of the present invention may include the step of utilizing a vacuum pump, in fluid communication with the bit chamber, to remove the bit chamber. A low pressure transducer in fluid communication with the bit chamber may be utilized to detect leaks in the bit chamber. Another feature of the present invention may include the step of removing the air from the bit chamber until an absolute pressure less than approximately 0.75 PSIA is achieved, and air may continue to be removed from the bit chamber for an additional period of time after the absolute pressure of approximately 0.75 PSIA has been achieved.

Another feature of this aspect of the present invention may include the step of utilizing a proportional air pressure operated lubricant pump to provide the pressurized lubricant to the bit chamber. An additional feature of this aspect of the present invention may include the step of continuously measuring and monitoring the pressure of the lubricant at the bit chamber while the pressurized lubricant is being provided to the bit chamber. The pressure of the pressurized lubricant may be decreased, upon the pressure of the lubricant at the bit chamber reaching a predetermined value. The pressure of the pressurized lubricant may be maintained at the predetermined value for an additional predetermined period of time after the predetermined pressure has been reached. An additional feature of the present invention may include the steps of determining the volume of pressurized lubricant loaded into the bit chamber, and comparing the volume of loaded pressurized lubricant with a standard volume of lubricant desired to be loaded into the bit chamber. A further feature of this aspect of the present invention may include the steps of venting the bit chamber to the atmosphere after it has been loaded with pressurized lubricant; and then again providing pressurized lubricant to the bit chamber, while the pressure of lubricant at the bit chamber is being measured, to assure that the bit chamber has been substantially, completely filled with lubricant.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE PREFERRED EMBODIMENT

Figure 2:
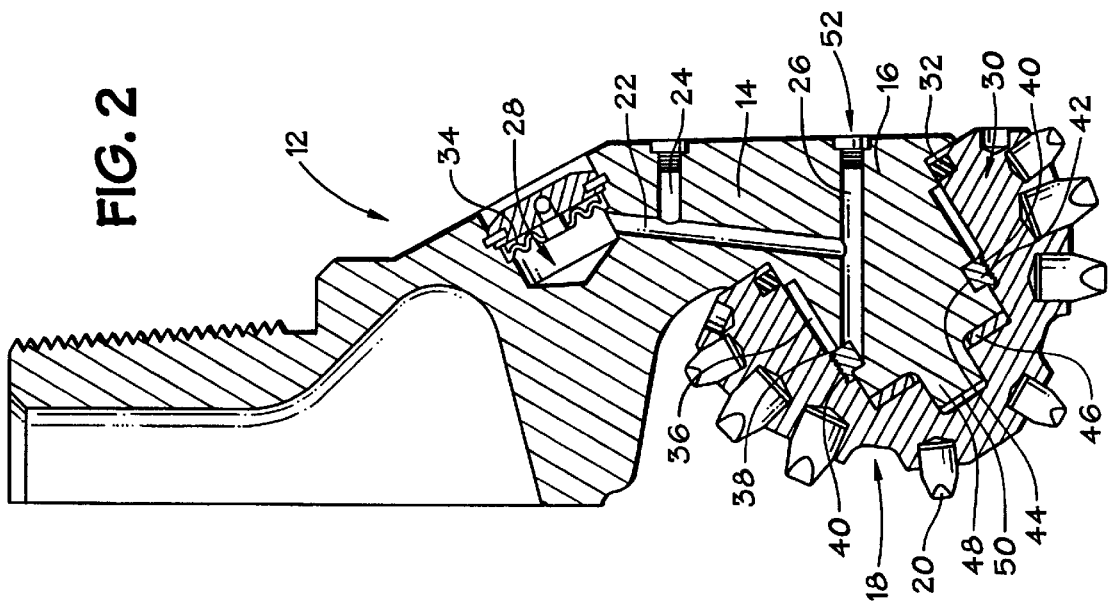
FIG. 2 is a partial cross-sectional view of a portion of the rock bit of FIG. 1 showing the bearings and internal lubricant passageways.
Figure 1:
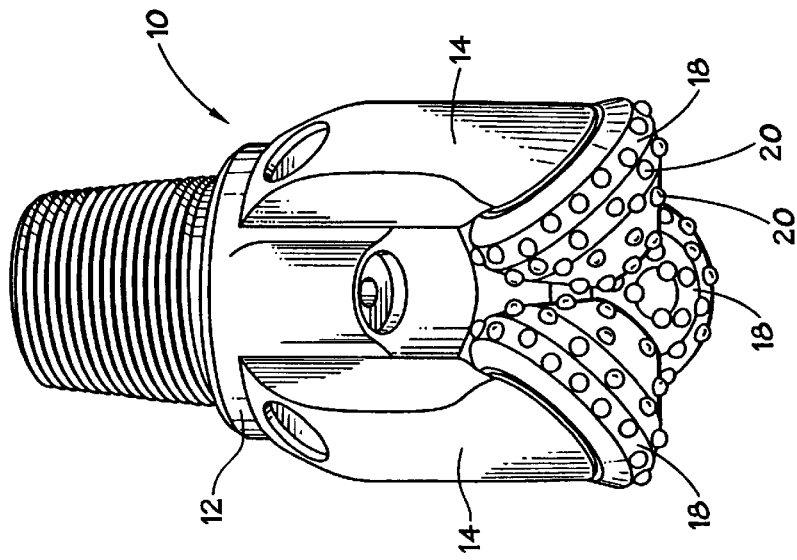
FIG. 1 is a perspective view of a rolling cutter rock bit.

Referring now to the drawing in more detail, and particularly to FIGS. 1 and 2, a rolling cutter drill bit, or rock bit, 10 includes a body 12 (portions of which are not shown). The body 12 of a typical rolling cutter drill bit comprises three similar leg portions 14 (only two are shown). A cantilevered bearing spindle 16 formed on each leg 14 extends inwardly and downwardly. A rolling cutter 18 is rotatably mounted upon the spindle 16 as hereinafter explained. Attached to the rolling cutter 18 are cutting inserts 20 which engage the earth to effect a drilling action and cause rotation of the rolling cutter 18. Typically, each cutting insert 20 will be formed of a hard, wear resistant material. Internal passageways 22, 24, & 26, as well as a reservoir 28 and bearing area 30 of the leg 14, are filled with lubricant (not shown) during bit assembly by a pressure feedback controlled lubricating device of the present invention. The lubricant helps reduce bearing friction and wear during bit operation and is retained within the cutter 18 by a dynamic seal 32. Pressure differentials between the lubricant and the external environment of the bit are equalized by the movement of a pressure balancing diaphragm 34.

The cutter 18 is mounted upon the cantilevered bearing spindle 16 formed on the leg 14. A sliding bearing member, or bearing, 36 is mounted between the spindle 16 and a mating bearing cavity 38 formed in the cutter 18. This bearing 36 is designed to carry the radial loads imposed upon the cutter 18 during drilling. A second bearing member 42 is configured as a split threaded ring which engages internal threads 40 in the bearing cavity 38 of the cutter. This second bearing, or retention bearing, member 42 serves to retain the cutter 18 upon the bearing spindle by resisting the forces which tend to push the cutter 18 inward during drilling. A third bearing member 46 is disposed between the bearing spindle 16 and the cutter 18 to carry the axial loads between the cutter 18 and the spindle 16.

In order for the drill bit 10 to perform to expectation during operation, the lubricant 15 (FIG. 4) must be loaded into the bit in a manner which does not put an excessive load, or forces, on the retention bearing member 42 or the pressure balancing diaphragm 34. At the same time it is also necessary to completely fill with lubricant: all the internal passageways 22, 24, 26; the reservoir 28; and the bearing area 30 of the bit all the way to the cavity 50 formed between the cutter 18 and the end of the pin 48 disposed upon the bearing spindle 16. The combination of all these passageways and cavities of a leg 14 of the bit 10 is collectively defined as a bit chamber, or chamber, 52. Typically, rock bits have three bit chambers 52, although commercially available bits may have as few as one bit chamber 52, or up to four or more bit chambers 52.

Figure 3:
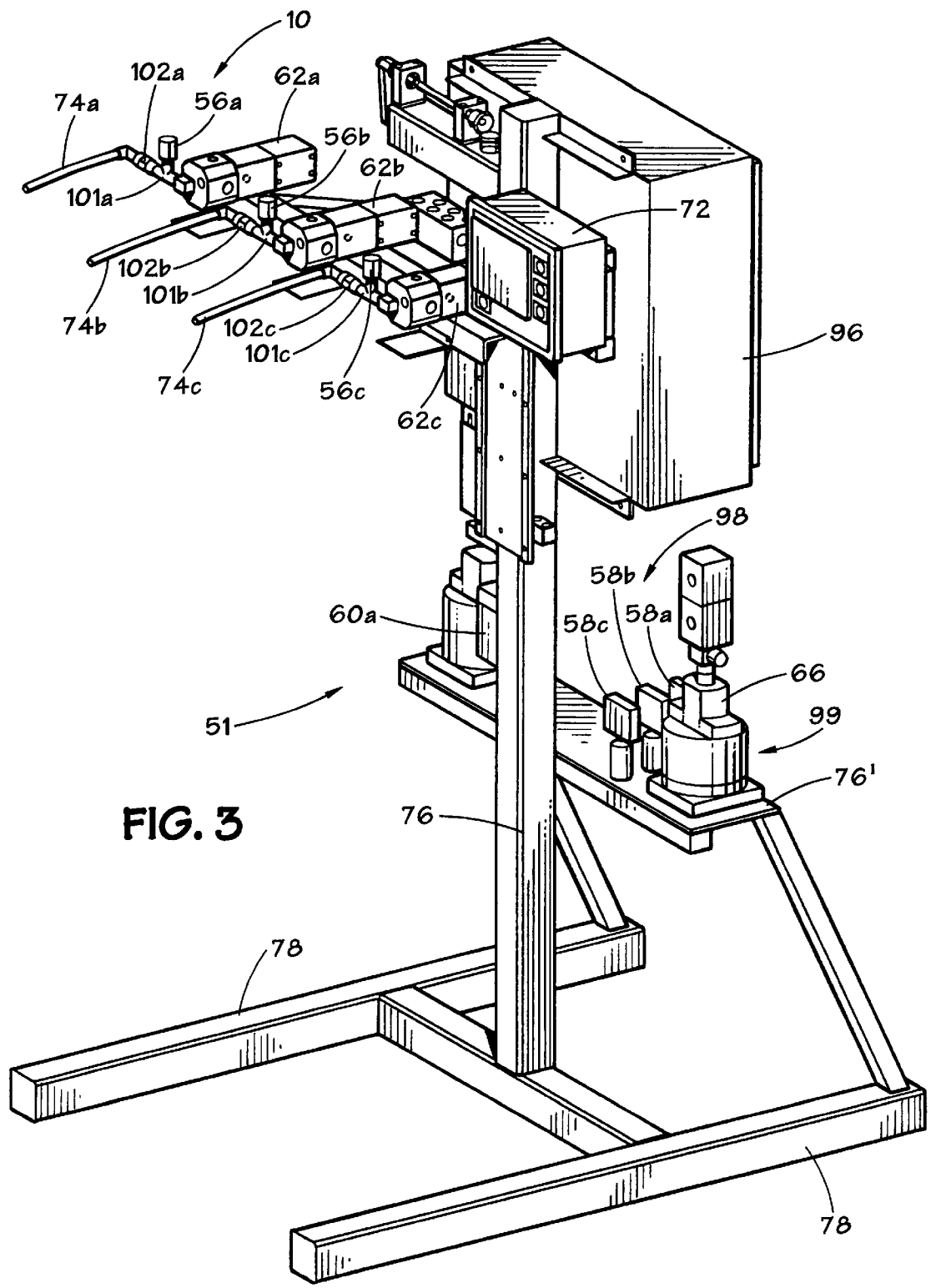
FIG. 3 is a perspective view of the preferred embodiment of a lubricant loading machine in accordance with the present invention.
Figure 4:
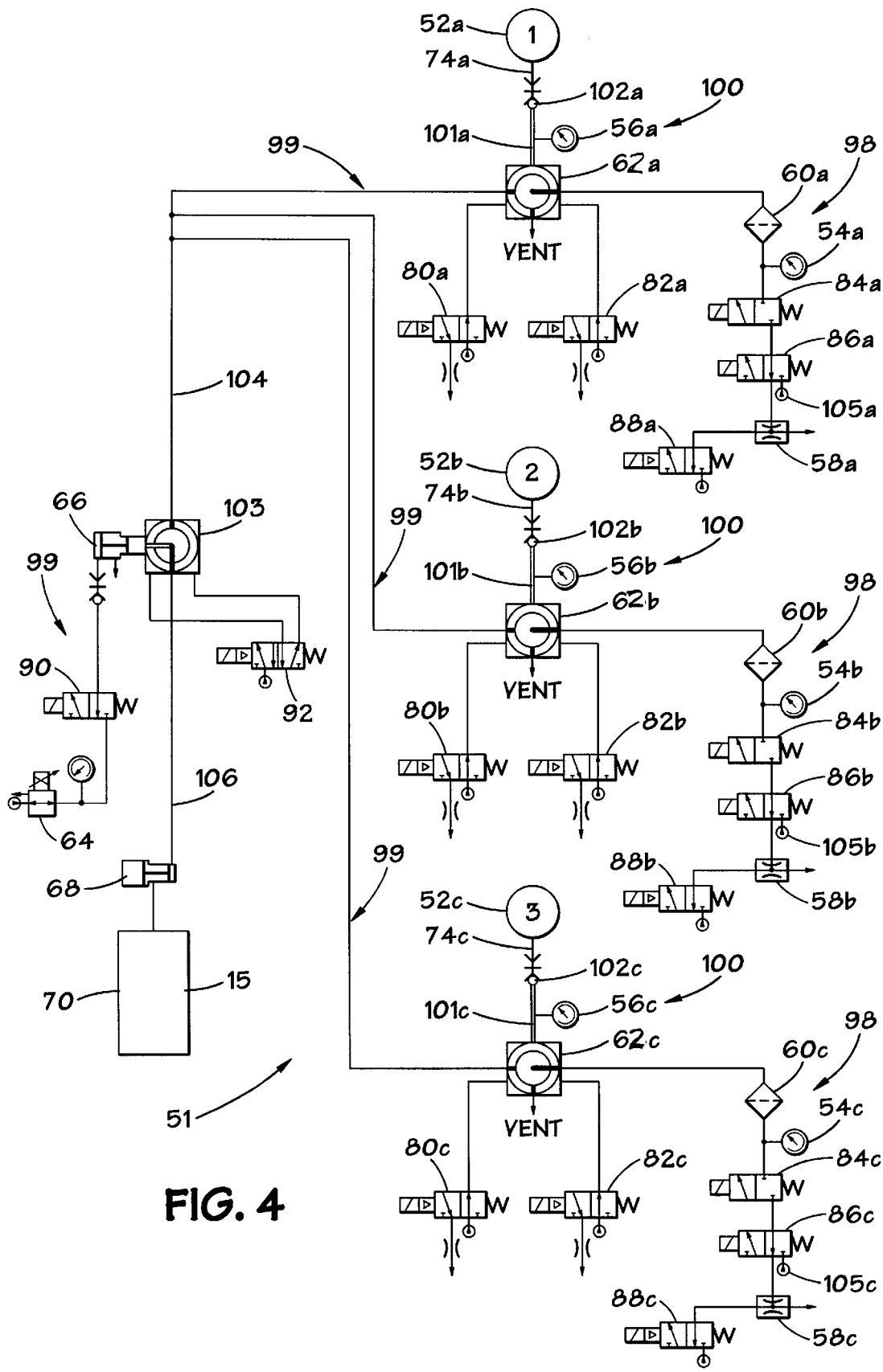
FIG. 4 is a schematic flow diagram illustrating how the components of the lubricant loading machine of FIG. 3 are interconnected.

With reference now to FIGS. 3 and 4, the apparatus 51 for loading lubricant into earth boring bits, in accordance with the present invention, will be described. The apparatus, or lubricant loading machine, 51 utilizes a closed loop lubricant pressure control system 110 (FIG. 5), as will be hereinafter described in greater detail. Lubricant loading machine 51 generally comprises: a means for removing 98 air from a bit chamber 52; a means for providing 99 pressurized lubricant to a bit chamber 52; a means for measuring 100 the pressure of the lubricant at the bit chamber 52; and a closed loop control system 110 for controlling and operating the means for providing 99 pressurized lubricant 15 to the bit chamber 52.

Still with reference to FIGS. 3 and 4, the details of the foregoing components will be described in further detail. Identical reference numerals having different letter subscripts are used to indicate that the various individual structures are identical. In this regard, the drill bit 10 of FIGS. 1 and 2 has three bit chambers, 52a, 52b, 52c, with one bit chamber 52a being associated with each of the three rolling cutters 18 of bit 10. Accordingly, the embodiment of the lubricant loading machine 51 of the present invention which is being described is illustrated as being constructed to load lubricant 15 into three bit chambers 52a, 52b, 52c. For ease of description, only the components used to fill bit chamber 52a will be described, since the components used for filling the other bit chambers 52b, 52c are identical, as is their operation.

Lubricant loading machine 51, as shown in FIG. 3, may be mounted upon any suitable support, such as vertical frame number 76 disposed upon base members 78. The drill bit, such as drill bit 10 of FIGS. 1 and 2, may be disposed adjacent lubricant loading machine 51 in any suitable manner, such as by disposing the drill bit 10 upon a table or a conveyor belt (not shown) adjacent lubricant loading machine 51. A flexible hose 74a, or other suitable tubing or piping, may be placed in fluid communication with bit chamber 52a, in a conventional manner, so that bit chamber 52a is in fluid communication with lubricant loading machine 51, as will be hereinafter described in greater detail.

The means for removing 98 air from bit chamber 52a preferably comprises a vacuum pump 58a which may be mounted upon a frame member 76' as shown in FIG. 3, or associated with machine 51 in any other manner. Vacuum pump 58a is in fluid communication with bit chamber 52a via: conventional tubing, or piping, 101a; four way control valve 62a; and flexible hose 74a. Hose 74a is preferably releaseably connected to, or associated with, the portion of piping 101a disposed between bit chamber 52a and the control valve 62a by use of a conventional quick-connect/disconnect fitting 102a. The air removing means 98 also preferably includes a low pressure transducer 54a disposed in tubing, or flow line, 101a between vacuum pump 58a and the bit chamber 52a. A solenoid 88a may be provided to control the operation of vacuum pump 58a. Solenoid 84a may be provided between the low pressure transducer 54a and vacuum pump 58a, the operation of which will be hereinafter described in greater detail. Additionally, another solenoid 86a may be provided as shown in FIG. 4, in accordance with another aspect of the invention to be hereinafter described. Air removal means 98 could be any other suitable device, other than pump 58a, which could remove air from bit chamber 52a to the preferred, desired pressure level, as hereinafter described in greater detail.

While the foregoing components are being utilized to remove any air from the interior of drill bit chamber 52a, solenoid 86a will be in its fluid transmitting position, as illustrated in FIG. 4. Although solenoid 84a is illustrated in its isolated position, when air is being removed from bit chamber 52a by operation of vacuum pump 58a, solenoid 84a will be in its fluid transmitting position, and not the isolated position illustrated in FIG. 4. Preferably, air removal means 98 includes an in-line filter 60a, the purpose and operation of which will be hereinafter described in greater detail. When the foregoing components are being utilized to remove air from bit chamber 52a, four way control valve 62a, will be disposed in fluid transmitting relationship between bit chamber 52a and vacuum pump 58a, as illustrated in FIG. 4. Accordingly, it is seen that upon vacuum pump 58a being operated in response to a control signal from solenoid 88a, vacuum pump 58a operates to remove air from bit chamber 52a to a desired pressure level, preferably, an absolute pressure less than 0.75 PSIA.

Still with reference to FIGS. 3 and 4, the means for providing 99 pressurized lubricant 15 to the bit chamber 52a preferably includes a proportional air pressure operated lubricant pump, or pump, 66 which may be disposed upon frame member 76' or any other suitable location. Pump 66 is disposed in fluid communication with drill bit chamber 52a via a two way control valve 103 in communication with tubing, or piping, 104a, which in turn is in fluid communication with four way control valve 62a. Solenoid 92 controls the operation of two way valve 103, as will be hereinafter described in greater detail. Proportional air pressure operated lube pump 66 is powered by air provided by proportional air regulator 64, and pump 66 is controlled by solenoid 90. The means for providing 99 pressurized lubricant 15 is supplied lubricant, or grease, 15 from a grease reservoir 70 via tubing, or piping, 106 in fluid communication between grease drum 70 and the two way control valve 103, upon operation of lubricant supply pump 68. Pump 68 may be capable of supplying pressurized grease to the lubricant providing means 99 at a pressure up to 2000 PSIA. Two way control valve 103, in the position illustrated in FIG. 4, places pump 66 in fluid communication with the grease drum 70, whereby pump 66 may be filled with a quantity of lubricant, or grease 15. Upon operation of solenoid 92, two way control valve 103 would be disposed in fluid communication between bit chamber 52a and pump 66 via tubing, or piping 104a. When control valve 103 is in the position shown in FIG. 4, the high pressure lubricant is being pumped by pump 66 operates to push, or force back, the piston (not shown) of pump 66 at the end of its pump stroke, thus filling pump 66 for the next pump stroke, which forces the grease, or lubricant, 15 into bit chamber 52a. Pressurized lubricant providing means 99 could be any other suitable device, other than pump 66, which can provide pressurized lubricant to bit chamber 52a.

The means for measuring 100 the pressure of the lubricant 15 at the bit chamber 52a preferably comprises a high pressure transducer 56a disposed in tubing 101a adjacent hose 74a. Because of the close proximity of high pressure transducer 56a to bit chamber 52a, high pressure transducer 56a is capable of accurately determining the pressure of the lubricant being supplied at bit chamber 52a. When the pressurized lubricant providing means 99 is being operated to provide pressurized lubricant to bit chamber 52a, the four way control valve 62a will be disposed in fluid communicating relationship with pump 66, and two way control valve 103 via piping 104a. In this regard, two solenoids, 80a and 82a are provided to control the operation of four way control valve 62a. Pressure measuring means 100 could be any other suitable device, other than high pressure transducer 56a, such as a pressure gauge, or other device, which may measure the pressure of the lubricant at bit chamber 52a.

Since grease, or lubricant, 15 must pass through that portion of the piping, or tubing, 101a disposed between the four way control valve 62a and fitting 102a, it is preferable that any grease, or lubricant, 15 remaining in that portion of tubing 101a, be purged, prior to another bit chamber 52a being loaded with lubricant 15. If such lubricant is not purged, it could be drawn into vacuum pump 58a, and affect its operation, or even render vacuum pump 58a inoperable. Accordingly, after drill bit chamber 52a has been filled, piping 101a is purged of air in the following manner. Solenoid 86a is disposed in its isolated position by control system 110, solenoid 84a disposed in its fluid transmitting position, and four way control valve 62a is disposed in fluid communication between bit chamber 52a and solenoid 86a. Solenoid 86a is provided with a supply air, or shop air, source, 105a, whereby high pressure air may then flow toward bit chamber 52a, thus purging, or forcing any grease, or lubricant, out of that portion of piping 101a disposed between the four way control valve 52a and the quick-connect fitting 102a. After piping 101a has been purged of any grease, the next drill bit chamber may have the air removed from the chamber by operation of the air removal means 98. In this regard, if any grease, or lubricant, should happen to remain within that piping 101a, such small amounts of grease will not be drawn into vacuum pump 58a, but rather such grease 15 will be filtered out by in-line filter 60a, thus protecting vacuum pump 58a.

As seen in FIG. 3, the lubricant loading machine 51 preferably has the closed loop control system 110 disposed within a housing 96 mounted upon frame 76, and an operator input/output device 72 may also be disposed upon frame member 76. It should be readily apparent to one of ordinary skill in the art that the closed loop control system, and housing 96, could also be disposed at a remote location from the other components of the lubricant loading machine 51. After an operator (not shown), has connected the bit chambers 52a, 52b, and 52c to their associated quick-connect fittings 102a, 102b, 102c, via hoses 74a, 74b, 74c, the operator then enters the appropriate information into input/output device 72. The information may include the type of drill bit 10 to be loaded with lubricant 15, which would affect the amount and pressure of lubricant to be loaded into drill bit 10. The operator would then start the operation of lubricant loading machine 51, as by pressing a button on the input/output device, or in any other suitable manner, whereby the operation of lubricant loading machine 51 would commence and be controlled by closed loop control system 110.

Having described the structure and operation of the various components of the lubricant loading machine 51 of the present invention, the method of the present invention for loading lubricant into a drill bit 10 will also be described in connection with FIGS. 3–5. After the operator (not shown) has placed the bit chambers 52 of a drill bit 10 in fluid communication with lubricant loading machine 51, in the manner previously described, the closed loop control system 110 will initially operate machine 51 to remove the air from the bit chambers, such as bit chamber 52a, by signaling solenoid 84a and 86a to assume their fluid communicating position, and signaling solenoid 82a to operate to dispose the four way control valve 62a in its fluid transmitting relationship between drill bit chamber 52a and vacuum pump 58a. Solenoid 88a will then be operated to activate, or turn on, vacuum pump 58a. Preferably, the air will be removed from bit chamber 52a until an absolute pressure less than 0.75 PSIA is achieved, and such absolute pressure will be sensed by low pressure transducer, or sensor, 54a and processed by control system 110. Upon the desired pressure being achieved, closed loop control system 110 would operate to send a signal to solenoid 88a to turn off vacuum pump 58a, and to send signals to solenoid 84a to assume its isolated position, whereby the bit chamber 52a is isolated from the vacuum pump 58a for a period of time in order to check whether or not there are any leaks in the system or the drill bit chamber 52a. The desired air pressure will continue to be monitored by the control system 110, via the signal received from low pressure transducer 54a. If the air pressure in the bit chamber 52a rises above a predetermined value greater than the desired pressure 0.75 PSIA, the control system 110 will halt the lubricant loading process, and an appropriate signal will be displayed on the input/output device 72 to advise the operator of the leak problem.

Preferably, when the desired pressure threshold less than 0.75 PSIA is reached by the operation of vacuum pump 58a, control system 110 will maintain the operation of the vacuum pump 58a for an additional 10 seconds, after which period of time the control system will operate to isolate drill bit chamber 52a from vacuum pump 58a. While drill bit chamber 52a is isolated from vacuum pump 58a, the pressure signal from low pressure transducer 54a will be monitored by control system 110 for an additional 15 seconds, to determine whether or not there are any leaks in the system, or drill bit chamber 52a. If there is more than one bit chamber 52a, the other bit chambers, such as bit chambers 52b, 52c, could have the air removed from them simultaneously by the other vacuum pumps 58c, 58b, or such air removal could be conducted sequentially by the other vacuum pumps 58b, 58c.

If drill bit chamber 52a maintains the desired pressure, the next step in the process of the present invention is to fill the bit chamber 52a with the lubricant, or grease, 15. Control system 110 would operate to have solenoid 80a operate to place four way control valve 62a in fluid communication with pump 66. Additionally, control system 110 would cause solenoid 92 to place two way control valve 103 similarly in fluid communication with drill bit chamber 52a. Control system 110 would then initiate the operation of pump 66, by signaling solenoid 90 to operate pump 66 via the application of pressure from proportional air regulator 64. While the lubricant 15 is being loaded into drill bit chamber 52, by the operation of pump 66, air is excluded from entering bit chamber 52a, and the pressure of the lubricant in bit chamber 52a is measured and monitored by high pressure transducer 56a which continuously sends a signal indicative of the pressure at the bit chamber 52 to control system 110. A higher pressure may be utilized for lubricant 15 in the beginning of the lubricant loading step, in accordance with a higher air pressure being supplied to pump 66, while the bit chamber 52a is first beginning to be filled with lubricant. As previously described, this higher pressure will permit the grease 15 to initially flow faster. As the pressure builds up within bit chamber 52a, such higher pressure is sensed by high pressure transducer 56a, and the control system 110 may operate to decrease the pressure being exerted by pump 66 once the lubricant pressure reaches a predetermined value, or set point, for the bit chamber 52a being loaded with lubricant. The desired predetermined pressure value may be maintained for a predetermined period of time in order to insure that the bit chamber 52a is completely filled. For example, for one type and size of bit 10, the system 110 would want to hold the pressure at 580 PSIA for six seconds. After the first bit chamber 52a has been filled, subsequent bit chambers, such as bit chambers 52b, 52c, may be sequentially filled in the preceding described manner, until all the bit chambers of the drill bit 10 have been loaded with lubricant. The input/output device 72 may then, if desired, signal the operator that the lubricant loading process has been completed.

The method for loading lubricant into a bit chamber of the present invention may also include additional method, or process, steps, if desired. If desired, after the bit chamber is first filled with lubricant, the control system may operate to signal one of the solenoids 80a or 82a to operate to place the four way control valve 62a in fluid communication with the atmosphere, as by venting the four way control valve 62a. Accordingly, some of the pressurized lubricant within drill bit chamber 52a will pass through hose 74a, that portion of piping 101a disposed between the four way control valve 62a and quick-connect fitting 102a, and through the four way control valve 62a to the atmosphere, or into a suitable receptacle that catches the vented grease. After the bit chamber 52a has been vented in the foregoing manner, control system 110 operates to place the four way control valve 62a in fluid communication once again with pump 66 and lubricant is again pumped into drill bit chamber 52a, while high pressure transducer 56a measures the pressure of the lubricant at the bit chamber, and the transducer, or sensor, 56a in cooperation with control system 110 assures that bit chamber 52a has been completely filled with lubricant 15. Another process step, if desired, is to terminate the pumping of lubricant into bit chamber 52a after the pressure in bit chamber 52a, as determined by high pressure transducer 56a, is maintained above a predetermined value for a second predetermined period of time to once again verify a complete filling of the bit chamber. If desired, the volume, or amount of lubricant introduced, or pumped into the bit chamber, may be measured and compared to the desired standard volume or amount of lubricant desired, and the result of such comparison can be computed and indicated to the operator. The foregoing process step can be accomplished by measuring the movement of the pump stroke of pump 66, and by knowing the volume of the pump for a given distance of pump stroke, control system 110 can determine the volume, or amount of grease that was actually pumped into a bit chamber. By practicing the foregoing step, the operator has a "double check" as to whether or not the proper amount of grease, or lubricant, has been introduced into bit chamber 56a. For example, if there has been a prior defect in the manufacture of the drill bit 10, such as the failure to drill out one of the passageways, such as passageways 22 or 24 in the body 12 of bit 10, lubricant loading machine 51 may properly function to achieve the desired pressure in the bit chamber 52a. By practicing the foregoing process step, an operator would know that there is a defect in the bit 10 even if the proper pressures were achieved since an improper amount of grease, or lubricant, was actually introduced into the bit chamber.

Figure 5:
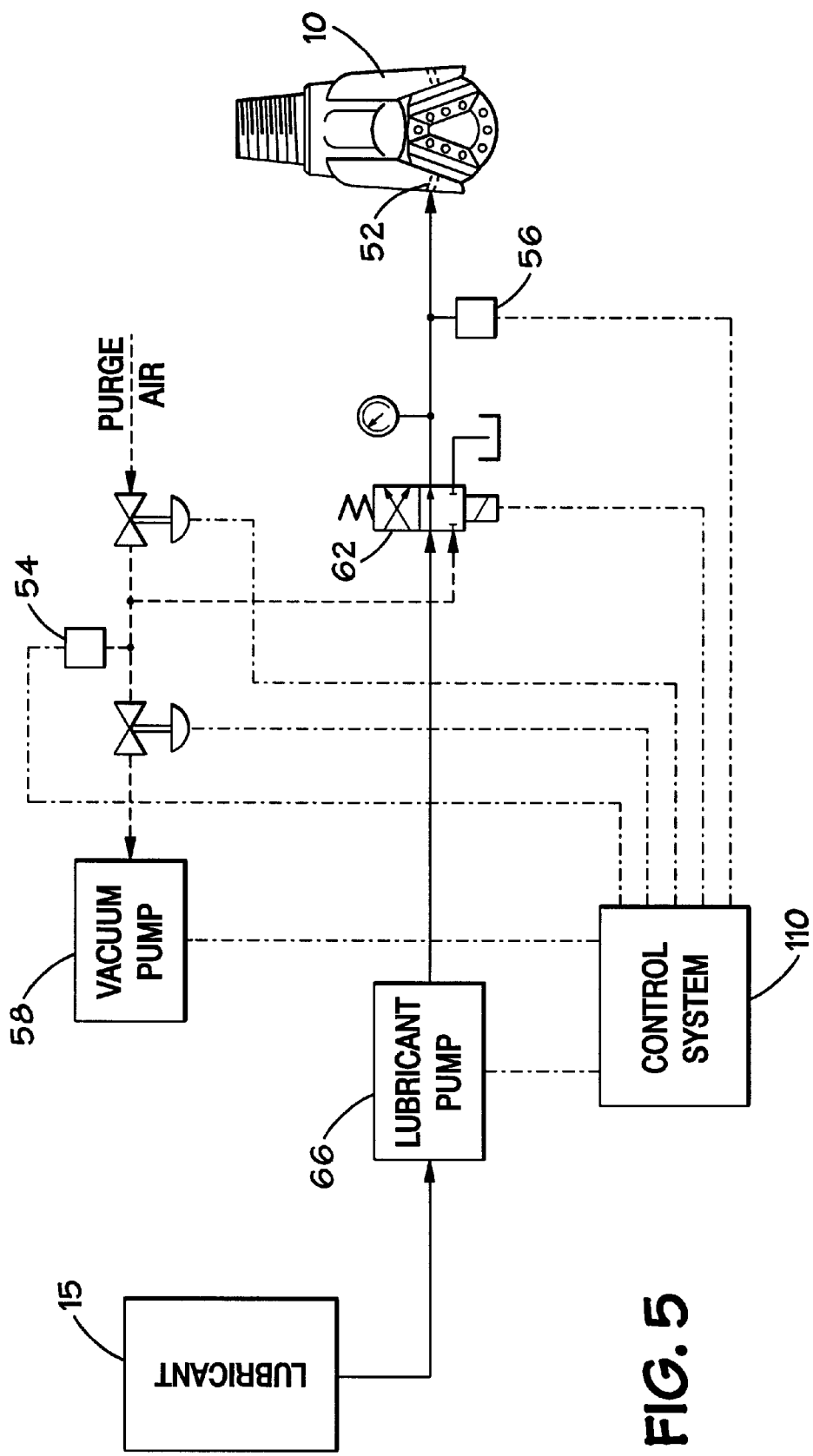
FIG. 5 is a schematic control system flow diagram of the lubricant loading machine in accordance with the present invention.

Closed loop control system 110, is schematically illustrated in FIG. 5, and operates to control the operation of the various solenoids and other components of lubricant loading machine 51, so as to operate machine 51 in the manner previously described. Control system 110 may be any suitably programmed microprocessor.

It is to be understood that the invention is not limited to the exact details of construction, operation, exact materials or embodiments shown and described, as obvious modifications and equivalents will be apparent to one skilled in the art. For example, additional proportional air pressure operated lubricant pumps could be provided, whereby all bit chambers could be simultaneously filled. Additionally, other types of control and/or actuation devices, other than solenoids, could also be utilized. Accordingly, the invention is therefore to be limited only by the scope of the appended claims.

I claim:

1. An apparatus for loading lubricant into a bit chamber of an earth boring bit comprising:

a means for removing air from the bit chamber;

a means for providing pressurized lubricant to the bit chamber;

a means for measuring the pressure of the lubricant at the bit chamber; and a control system for controlling and operating the pressurized lubricant providing means based upon the pressure of the lubricant, wherein the control system is a closed loop control system.

2. The apparatus of claim 1, wherein the means for removing air is a vacuum pump in fluid communication with the bit chamber.

3. The apparatus of claim 2, further including a low pressure transducer disposed between the bit chamber and the vacuum pump.

4. The apparatus of claim 2, further including a filter disposed between the bit chamber and the vacuum pump.

5. The apparatus of claim 1, wherein the means for providing pressurized lubricant is a lubricant pump.

6. The apparatus of claim 1, wherein the means for measuring the pressure of the lubricant is a high pressure transducer disposed adjacent to, and in fluid communication with, the bit chamber.

7. The apparatus of claim 1, wherein the closed loop control system operates and controls the pressurized lubricant providing means to decrease the pressure of the pressurized lubricant, upon the lubricant pressure measuring means indicating that the pressure of the lubricant at the bit chamber has reached a predetermined value.

8. The apparatus of claim 1, wherein the closed loop control system determines the volume of pressurized lubricant loaded into the bit chamber, and the closed loop control system compares the volume to a standard volume of lubricant desired to be loaded into the bit chamber.

9. An apparatus for loading lubricant into a bit chamber of an earth boring bit comprising:
a means for removing air from the bit chamber;
a means for providing pressurized lubricant to the bit chamber;
a means for measuring the pressure of the lubricant at the bit chamber; and
a control system for controlling and operating the pressurized lubricant providing means based upon the pressure of the lubricant,
the means for providing pressurized lubricant is a lubricant pump, wherein the lubricant pump is a proportional air pressure operated lubricant pump.

10. The apparatus of claim 9, wherein the lubricant pump is powered by air provided by a proportional air regulator.

11. An apparatus for loading lubricant into a bit chamber of an earth boring bit comprising:
a means for removing air from the bit chamber;
a means for providing pressurized lubricant to the bit chamber;
a means for measuring the pressure of the lubricant at the bit chamber; and
a control system for controlling and operating the pressurized lubricant providing means based upon the pressure of the lubricant,
the means for providing pressurized lubricant is a lubricant pump, wherein a fluid passageway is disposed between the means for providing pressurized lubricant and the bit chamber, and further including a means for purging lubricant from at least a portion of the fluid passageway.

12. A method for loading lubricant into a bit chamber of an earth boring bit, comprising the steps of:
a) removing air disposed within the bit chamber;
b) providing pressurized lubricant to the bit chamber;
c) measuring the pressure of the lubricant at the bit chamber; and
d) controlling the providing of pressurized lubricant to the bit chamber based upon the pressure of the lubricant, and
e) utilizing a proportional air pressure operated lubricant pump to provide the pressurized lubricant to the bit chamber.

13. The method of claim 12, including the step of utilizing a vacuum pump, in fluid communication with the bit chamber, to remove the air from the bit chamber.

14. The method of claim 12, including the step of utilizing a low pressure transducer in fluid communication with the bit chamber to detect leaks in the bit chamber.

15. The method of claim 12, including the step of removing the air from the bit chamber until an absolute pressure less than approximately 0.75 PSIA is achieved.

16. The method of claim 15, including the step of continuing to remove air from the bit chamber for an additional period of time after the absolute pressure of approximately 0.75 PSIA has been achieved.

17. The method of claim 12, including the step of powering the lubricant pump by pressurized air from a proportional air regulator.

18. The method of claim 12, wherein a fluid passageway is disposed between the bit chamber and the lubricant pump, including the step of purging lubricant from at least a portion of the fluid passageway, after the bit chamber has been loaded with lubricant.

19. The method of claim 12, including the step of utilizing a high pressure transducer disposed adjacent to, and in fluid communication with, the bit chamber to measure the pressure of the lubricant.

20. The method of claim 12, including the step of continuously measuring and monitoring the pressure of the lubricant at the bit chamber while the pressurized lubricant is being provided to the bit chamber.

21. A method for loading lubricant into a bit chamber of an earth boring bit, comprising the steps of:
a) removing air disposed within the bit chamber;
b) providing pressurized lubricant to the bit chamber;
c) measuring the pressure of the lubricant at the bit chamber;
d) controlling the providing of pressurized lubricant to the bit chamber based upon the pressure of the lubricant; and including the steps of decreasing the pressure of the pressurized lubricant, upon the pressure of the lubricant at the bit chamber reaching a predetermined value.

22. The method of claim 21, including the step of maintaining the pressure of the pressurized lubricant at the predetermined value for an additional predetermined period of time after the predetermined pressure value has been reached.

23. A method for loading lubricant into a bit chamber of an earth boring bit, comprising the steps of:
a) removing air disposed within the bit chamber;
b) providing pressurized lubricant to the bit chamber;
c) measuring the pressure of the lubricant at the bit chamber;
d) controlling the providing of pressurized lubricant to the bit chamber based upon the pressure of the lubricant; and including the steps of determining the volume of pressurized lubricant loaded into the bit chamber, and comparing the volume of loaded pressurized lubricant with a standard volume of lubricant desired to be loaded into the bit chamber.

24. A method for loading lubricant into a bit chamber of an earth boring bit, comprising the steps of:
a) removing air disposed within the bit chamber;
b) providing pressurized lubricant to the bit chamber;
c) measuring he pressure of the lubricant at the bit chamber;
d) controlling the providing of pressurized lubricant to the bit chamber based upon the pressure of the lubricant; and including the steps of: venting the bit chamber to the atmosphere after it has been loaded with pressurized lubricant; and then again providing pressurized lubricant to the bit chamber, while the pressure of lubricant at the bit chamber is being measured, to assure that the bit chamber has been substantially, completely filled with lubricant.

25. An apparatus for loading lubricant into a bit chamber of an earth boring bit comprising:
a pump for removing air from the bit chamber;
a lubricant pump for providing pressurized lubricant to the bit chamber;
a lubricant pressure measuring device which measures the pressure of the lubricant at the bit chamber; and a control system for controlling and operating the lubricant pump based upon the pressure of the lubricant;
wherein the control system is a closed loop control system.

26. The apparatus of claim 25, wherein the pump is a vacuum pump in fluid communication with the bit chamber.

27. The apparatus of claim 26, further including a low pressure transducer disposed between the bit chamber and the vacuum pump.

28. The apparatus of claim 26, further including a filter disposed between the bit chamber and the vacuum pump.

29. The apparatus of claim 25, wherein a fluid passageway is disposed between the lubricant pump and the bit chamber, and further including a means for purging lubricant from at least a portion of the fluid passageway.

30. The apparatus of claim 25, wherein the lubricant pressure measuring device is a high pressure transducer disposed adjacent to, and in fluid communication with, the bit chamber.

31. The apparatus of claim 25, wherein the closed loop control system operates and controls the lubricant pump to decrease the pressure of the pressurized lubricant, upon the lubricant pressure measuring device indicating that the pressure of the lubricant at the bit chamber has reached a predetermined value.

32. The apparatus of claim 25, wherein the closed loop control system determines the volume of pressurized lubricant loaded into the bit chamber, and the closed loop control system compares the volume to a standard volume of lubricant desired to be loaded into the bit chamber.

33. An apparatus for loading lubricant into a bit chamber of an earth boring bit comprising:

a pump for removing air from the bit chamber;

a lubricant pump for providing pressurized lubricant to the bit chamber;

a lubricant pressure measuring device which measures the pressure of the lubricant at the bit chamber; and a control system for controlling and operating the lubricant pump based upon the pressure of the lubricant;

wherein the lubricant pump is a proportional air pressure operated lubricant pump.

34. The apparatus of claim 33, wherein the lubricant pump is powered by air provided by a proportional air regulator.

* * * * *